(12) United States Patent
Duval

(10) Patent No.: US 9,010,385 B2
(45) Date of Patent: Apr. 21, 2015

(54) CONNECTION DEVICE FOR A SYSTEM FOR FILLING JARS FOR THE PRODUCTION OF NUCLEAR FUEL

(75) Inventor: Patrice Duval, Villeneuve les Avignon (FR)

(73) Assignee: Areva NC, Paris (FR)

( * ) Notice: Subject to any disclaimer, the term of this patent is extended or adjusted under 35 U.S.C. 154(b) by 719 days.

(21) Appl. No.: 13/375,707

(22) PCT Filed: Jun. 2, 2010

(86) PCT No.: PCT/EP2010/057681
§ 371 (c)(1),
(2), (4) Date: Dec. 30, 2011

(87) PCT Pub. No.: WO2010/139712
PCT Pub. Date: Dec. 9, 2010

(65) Prior Publication Data
US 2012/0090728 A1 Apr. 19, 2012

(30) Foreign Application Priority Data

Jun. 2, 2009 (FR) ..................................... 09 53627

(51) Int. Cl.
*B65B 1/20* (2006.01)
*G21C 21/02* (2006.01)
(Continued)

(52) U.S. Cl.
CPC ................. *G21C 21/02* (2013.01); *F16L 27/11* (2013.01); *G21C 3/62* (2013.01); *G21C 3/623* (2013.01); *G21C 21/04* (2013.01); *Y02E 30/38* (2013.01)

(58) Field of Classification Search
CPC .............. F16L 27/11; B65B 1/08; B65B 1/22

USPC .................... 141/2, 72–74, 83, 263, 266, 269
See application file for complete search history.

(56) References Cited

U.S. PATENT DOCUMENTS 2,524,560 A * 10/1950 Cote ............................... 141/12
2,596,824 A * 5/1952 Scott ............................... 177/68
(Continued)

FOREIGN PATENT DOCUMENTS

CN 85 1 05215 1/1987
CN 2725684 9/2005
(Continued)

OTHER PUBLICATIONS

Office Action in Japanese Patent Application No. 2012-513607, mailed May 13, 2014.
(Continued)

*Primary Examiner* — Timothy L Maust
(74) *Attorney, Agent, or Firm* — Nixon Peabody LLP

(57) ABSTRACT

A system for filling a jar with powdery material, for example for the manufacture of nuclear fuel, including a device for connection between the jar and a material feed system, where the device includes:
a stationary connection portion connected to the feed system,
a connection portion which moves relative to the stationary connection portion intended to be connected to the container's filling orifice, where the moving connection portion includes in the area of a downstream end a lip seal to achieve a tight connection by contact with the contours of the jar's filling orifice and where the said downstream end is connected to the stationary connection portion by a bellows so as to provide mechanical disengagement between the downstream end of the moving connection portion and the stationary connection portion.

17 Claims, 4 Drawing Sheets

Figure 1:
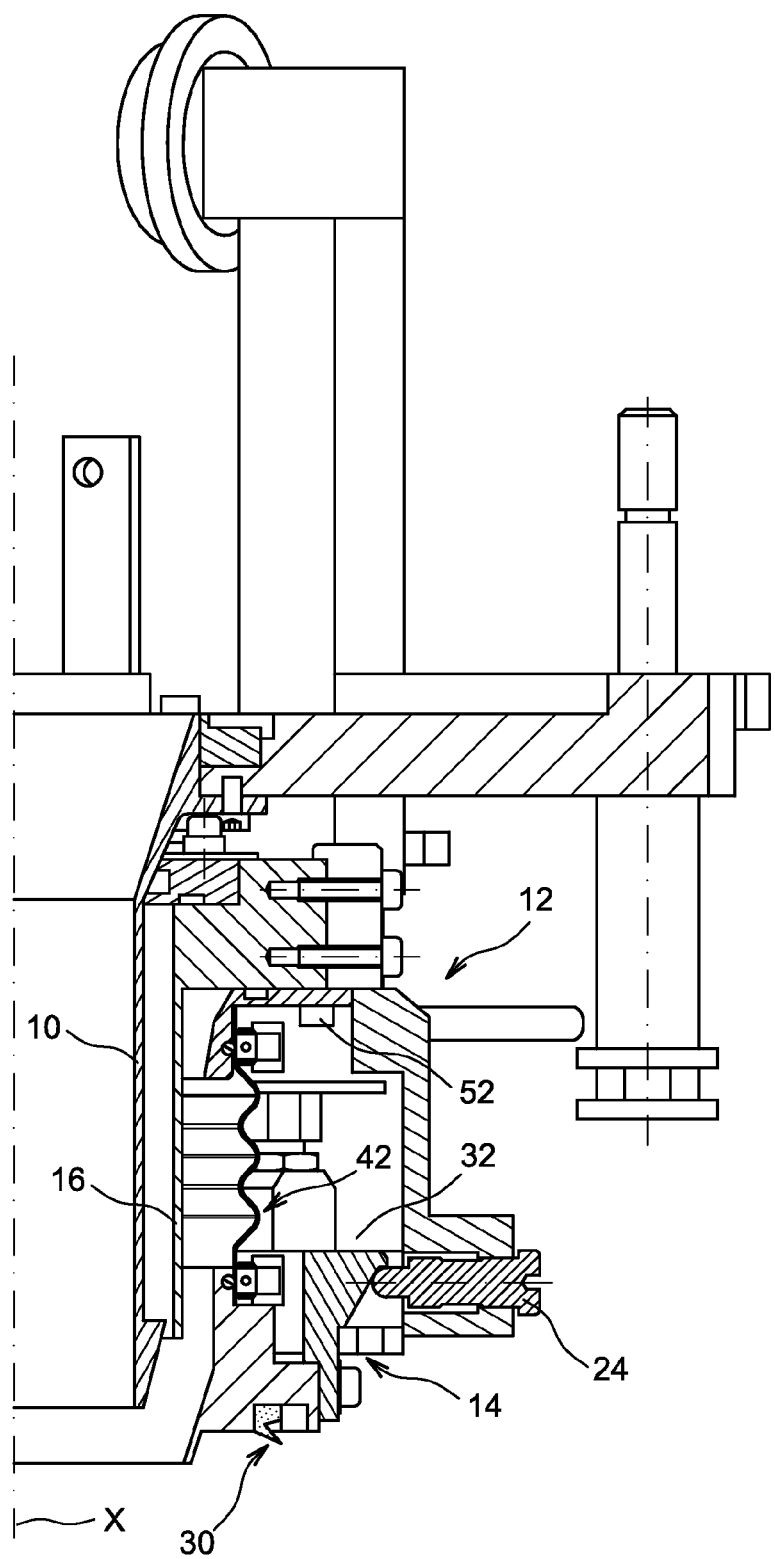

(51) Int. Cl.
  *F16L 27/11* (2006.01)
  *G21C 3/62* (2006.01)
  *G21C 21/04* (2006.01)

(56) References Cited

U.S. PATENT DOCUMENTS

| | | | | |
|---|---|---|---|---|
| 3,530,928 | A * | 9/1970 | Swinney | 164/201 |
| 4,182,591 | A * | 1/1980 | Stanelle | 414/291 |
| 4,688,371 | A * | 8/1987 | Hecht | 53/502 |
| 4,942,953 | A * | 7/1990 | Chefson | 193/25 C |
| 5,259,425 | A * | 11/1993 | Johnson et al. | 141/12 |
| 6,269,852 | B1 * | 8/2001 | Muhr | 141/287 |
| 6,293,316 | B1 | 9/2001 | Bertolotti et al. | |
| 2003/0132630 | A1 | 7/2003 | French | |
| 2006/0032551 | A1 * | 2/2006 | Sterner et al. | 141/314 |
| 2008/0265570 | A1 | 10/2008 | McPheat | |
| 2009/0046826 | A1 | 2/2009 | Bariteau et al. | |

FOREIGN PATENT DOCUMENTS

| | | |
|---|---|---|
| CN | 101292302 | 10/2008 |
| FR | 2308855 A1 | 11/1976 |
| FR | 2562309 A1 | 10/1985 |
| FR | 2834768 A1 | 7/2003 |
| JP | 59-144496 U | 9/1984 |
| JP | 2009-537002 A | 10/2009 |
| RU | 2 220 764 C1 | 1/2004 |

OTHER PUBLICATIONS

Notice of Allowance in Russian Application No. 2011152861, dated Mar. 4, 2014 (partial translation—allowed claims).
International Search Report for PCT/EP2010/057681 dated Jul. 22, 2010.
Preliminary Search Report for French Application No. 0953627 dated Jan. 19, 2010.
Office Action in Chinese Patent Application No. 201080031417.4 dated Mar. 28, 2013 (English Translation of Search Report only).

* cited by examiner

CONNECTION DEVICE FOR A SYSTEM FOR FILLING JARS FOR THE PRODUCTION OF NUCLEAR FUEL

CROSS-REFERENCE TO RELATED PATENT APPLICATION

The present application is a National Stage Application of International Application No. PCT/EP2010/057681 entitled "Connection Device For A System For Filling Jars For The Production Of Nuclear Fuel" filed Jun. 2, 2010, which claims priority of French Patent Application No. 0953627, filed Jun. 2, 2009, the contents of which are incorporated herein by reference in their entirety.

DESCRIPTION

TECHNICAL FIELD AND PRIOR ART

The present invention relates to a device for filling jars with materials intended for the manufacture of nuclear fuel, in particular for the manufacture of MOX pellets (mixture of $PuO_2$ and UO2).

MOX pellets are manufactured as follows: the various materials to be used in the manufacture of the pellets are stored separately in the form of powder. These materials are $UO_2$, $PuO_2$ and chamotte. This mixture of powders is then compressed so as to form pellets, which will subsequently be subject to a fritting step.

The mixture is then produced in jars. To do so, a given quantity of chamotte is placed in the jar, and then a given quantity of $PuO_2$ and finally a given quantity of $UO_2$, although the UO2 can be put in the jar before the $PuO_2$.

The quantities placed in the jar are measured by weighing.

Handling of plutonium and uranium oxide powders requires great precautions due to their toxicity. In particular, when powders pour out they tend to disperse. It is therefore necessary to confine them.

Filling is undertaken in a glove box to prevent any risk of the powder escaping. However, it is necessary, as far as possible, to prevent contaminating the systems positioned in the glove box, and the outer surface of the jar, since the latter will be carried elsewhere for the manufacture of the pellets. A connection device is placed between the tanks and the jar.

Vibrating chutes are generally used to convey the powder from the tanks to the filling device. The vibrations are then transmitted to the filling device. Consequently, in order not to disturb the measurements by weighing, contact between the filling device and the jar is avoided.

Existing filling devices then include a filling tube penetrating into the neck of the jar, avoiding any contact with the latter in order not to distort the measurements of the weigh scale, and implement dynamic confinement of the powders, i.e. continuous suction in the space between the neck of the jar and the filling tube, in order to collect any powders which might escape.

The device is complex. It requires very accurate positioning in order to prevent contact with the jar, whilst ensuring that there is very little clearance, of the order of a few mm.

In addition, this continuous suction is obtained by a suction system using filters, which naturally become soiled over time. These filters must be changed regularly in order to maintain confinement efficiency, thus forming nuclear waste which must be managed.

It is consequently one aim of the present invention to provide a system for filling a container with powder for the production of nuclear fuel, implementation of which provides safe and accurate dosing of the quantities of powder, and reduces the waste.

ACCOUNT OF THE INVENTION

The aim previously set out is obtained by a device to connect a container with powders containing a cylindrical pipe intended to be placed opposite a filling orifice of the container without contact with the edges of the orifice, where a ring comes into contact with the edge of the orifice in a tight fashion, where the said ring surrounds the filling pipe in tight fashion, and which moves relative to the latter. The ring is mechanically disengaged from the filling pipe in order not to disturb the weighing during the filling. Only the seal ring must then be taken into account when weighing.

This device provides a tight confinement requiring no suction system. Consequently, no filter is used. Waste generation is therefore eliminated.

In addition, this device does not require great positioning accuracy relative to the container. Risks of error in producing the mixture are consequently small.

In other words, a static seal is produced between the connection device and the container, providing a safe and robust system.

The subject-matter of the present invention is therefore mainly a tight connection device between a system for feeding powdery or granular materials for the manufacture of nuclear fuel and a container fitted with a filling orifice, where the said device includes:

a stationary connection portion intended to be connected to the feed system, a connection portion which moves relative to the stationary connection portion intended to be connected to the container's filling orifice, where the moving connection portion includes in the area of one downstream end at least one seal to produce a tight connection by contact with the contours of the filling orifice, and where the downstream end of the moving connection portion is connected to the stationary connection portion by tight and flexible means, so as to provide a mechanical disengagement between the downstream end of the moving connection portion and the stationary connection portion.

The stationary connection portion can form a hopper for collecting materials, in which the moving connection portion includes a supporting ring assembled in sliding and tight fashion around the stationary pipe and a seal ring forming the downstream end of the moving connection portion, where the seal ring is intended to come into tight contact with the contour of the filling orifice, where the seal ring and the supporting ring are connected by a tight bellows providing the mechanical disengagement between the stationary connection portion and the downstream end of the moving connection portion.

Advantageously, the tight connection device according to the invention includes means to limit the movement of the seal ring away from the supporting ring, where the said means are active when the seal ring is not in contact with the contour of the filling orifice, and are inactive when the seal ring is in contact with the contour of the filling orifice.

The means of limitation include, for example, radial pins and a shoulder upstream from the pins such that, when the seal ring comes into contact with the contour of the filling orifice the shoulder and the pins separate.

The device can also include means to cause the supporting ring to slide axially relative to the stationary connection portion, for example means of the electric jack type.

The sealing means supported by the seal ring are, for example, formed by a lip seal assembled in a groove.

The bellows is advantageously assembled on the supporting ring by means of a mounting flange, and the upstream and downstream ends of the bellows are attached to the mounting flange and to the seal ring, respectively, by means of clamp connections. It is therefore easy to replace the bellows.

The mounting flange is, for example, secured axially to the supporting ring by a bayonet system.

The supporting ring is advantageously extended by a pipe conveying in the direction of the seal ring, guiding the powder as far as the container's filling orifice, and protecting the bellows.

There can also be sealing means between the conveyance pipe and the collecting hopper to provide sealed sliding.

The supporting ring can include a vent ring, communicating with the interior of the container by a passage demarcated between the bellows and the conveyance pipe.

Another subject-matter of the present invention is a filling system including powder feed pipes, a tight connection device according to the present invention, and a weighing device supporting the container, where the feed pipes are connected to the stationary connection portion.

The feed pipes are advantageously of the vibrating chute type. Vibrating chutes can be operated so as to deliver the materials at high speed at the start of the filling, and then to deliver the materials at slower speeds when the delivered quantity is close to the desired quantity.

The weighing system is advantageously able to be positioned close to the filling orifice of the container of the tight connection device.

Another subject-matter of the present invention is a method for filling a container by means of the system for filling a container according to the present invention, including the following steps:
- positioning of the container beneath the connection device,
- weighing of the container,
- bringing the tight connection device close to the container's filling orifice,
- bringing the seal ring into contact with the contour of the filling orifice in order to make a tight connection,
- weighing of the assembly formed by the container and the seal ring,
- arrival of the material or materials.

Between each filling by a material, the seal ring is advantageously separated from the contour of the filling orifice and the container with its content is weighed.

BRIEF DESCRIPTION OF THE ILLUSTRATIONS

Figure 2A:
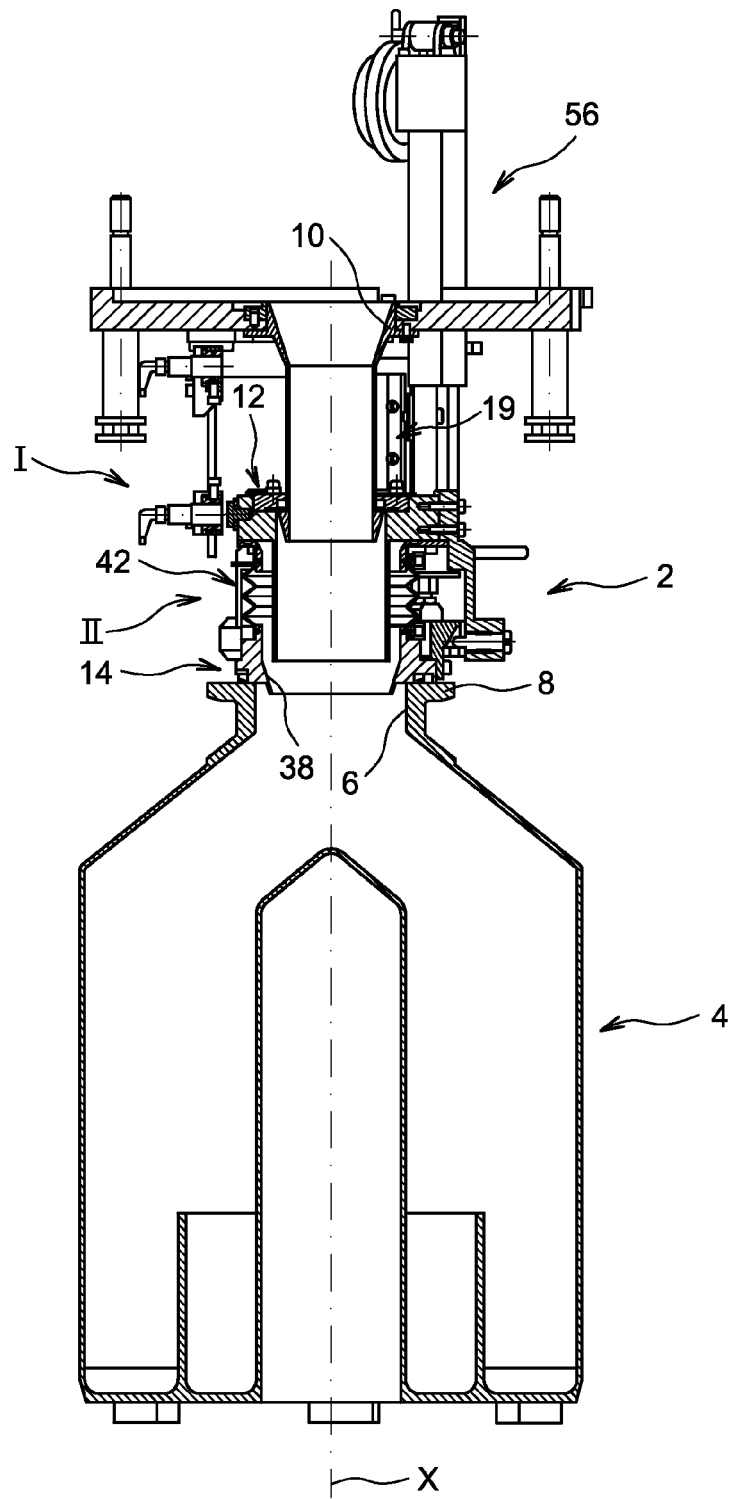
Figure 2B:
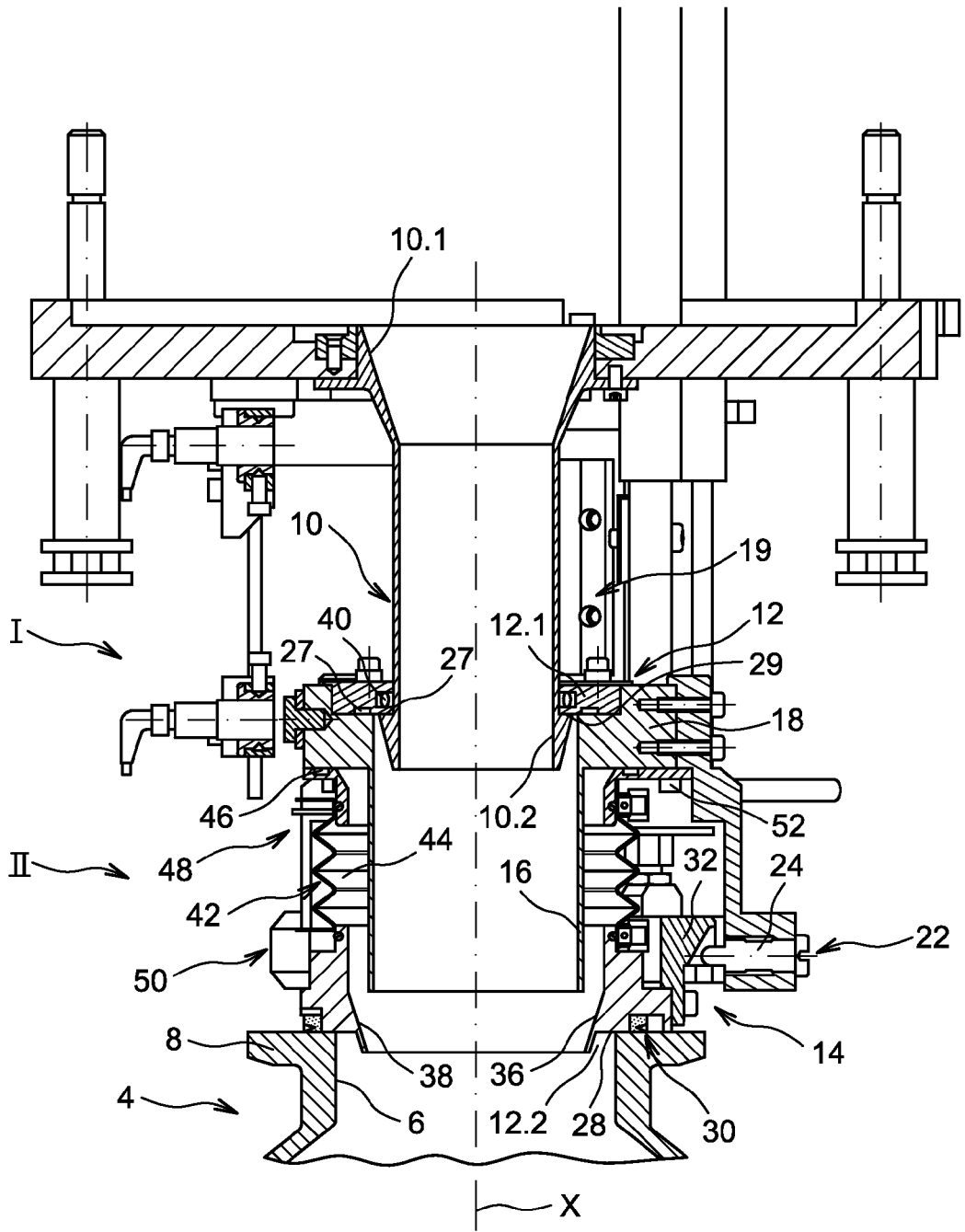
Figure 3:
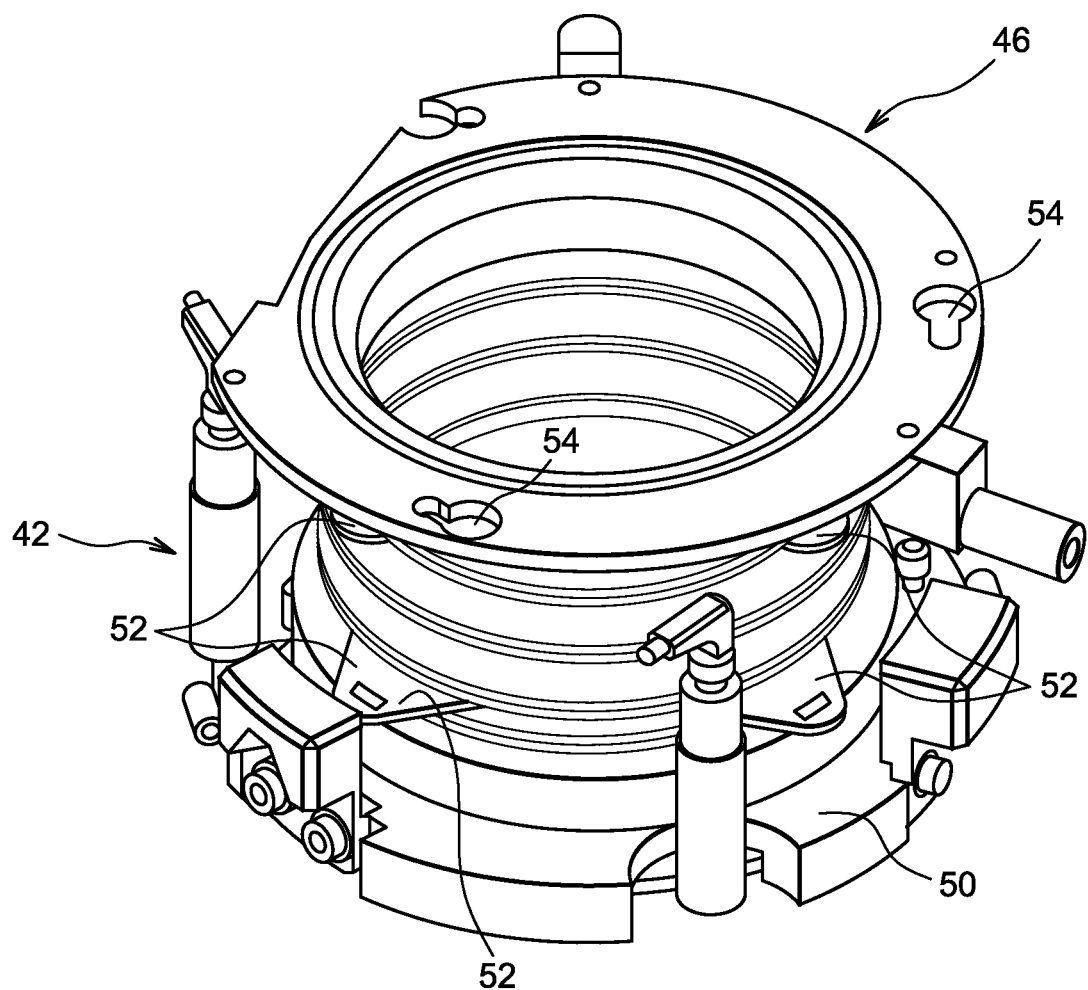

The present invention will be better understood using the description which follows and the appended illustrations, in which:

FIG. 1 is a lengthways section view of the connection device in a position in which it is not connected to a container which is to be filled, FIG. 2A is a lengthways section view of the connection device in a position in which it is connected to the container, FIG. 2B is an enlarged view of the connection device of FIG. 2A, FIG. 3 is a detailed view of a component of the device of FIG. 1.

DETAILED ACCOUNT OF PARTICULAR EMBODIMENTS

A unit for manufacturing nuclear fuel includes a system for filling a jar including a dosing module including several pipes for conveying powder as far as a device for connection to a jar. The jar is positioned on a scale and the various dosings are accomplished by weighing the jar. When a mixture of powder is produced the filled jar is replaced by an empty jar.

In FIG. 2A an example embodiment of a connection device 2 according to the present invention can be seen, positioned above a container 4 in which the mixture will be produced. Container 4 is generally called a jar.

The description will use as an example the production of a mixture of $PuO_2$ powders and UO2 powders. However, the present invention applies to all types of powder. Powder, in the present application, is understood to mean a material in granular or particular form, the size of which may attain, for example, approximately 1 mm.

Jar 4 includes a filling orifice 6 lined with a neck 8.

Connection device 2 represented in FIGS. 1, 2A and 2B, is intended to be positioned between an area through which the various powders (not represented) are conveyed, this area being upstream from the connection device and jar 4.

Connection device 2 roughly has a lengthways axis X.

Lengthways axis X is roughly aligned in the flow direction of the powders.

Jar 4 also has a lengthways axis; the jar is positioned under the device such that its axis is roughly the same as axis X.

According to the present invention, the connection device includes a portion I intended to be on the side of the powder arrival area, called the upstream portion, intended to be stationary relative to the installation, and a portion II on the side of jar 4, called the downstream portion, intended to be moved.

Upstream portion I includes a collecting hopper 10 of axis X, a first lengthways end of which 10.1 is intended to be positioned on the side of the powder conveyance area, and a second lengthways end 10.2 intended to guide the powders towards the jar.

Downstream portion II is positioned around hopper 10 and is able to move along axis X.

Downstream portion II forms a mobile rig consisting of a first part 12 forming a support and a second part 14 intended to come into contact with neck 8 of jar 4.

First part 12 includes an upstream lengthways end 12.1 and a downstream lengthways end 12.2. Downstream lengthways end 12.2 is intended to be positioned opposite filling orifice 6 and to guide the powder to this orifice 6.

First part 12 includes a supporting ring 18 which is extended by a pipe 16 aligned with hopper 10.

The movement of supporting ring 18 and of conveyance pipe 16 relative to the hopper is advantageously facilitated by a ball-bearing runner 19.

First part 12 includes, in the area of its downstream end, stop elements 22 protruding radially inwards. In the represented example, these stop elements are formed by pins 24 extending radially inwards.

First part 12 may also include a ventilating aperture made in supporting ring 18 in the area of the upstream end of pipe 16. If the diameter of hopper 10 is sufficiently large there is no risk of the passage being obstructed, since the gases present in the jar pass into the hopper. In this case the device is completely tight.

Downstream end 10.2 of collecting hopper 10 includes an external shoulder 27 cooperating with a radial surface 29 of supporting ring 18, protruding inwards, so as to form an axial stop for the movement of first part 12. In addition, this contact forms a metal-on-metal seal. Radial surface 29 is supported by a removable ring allowing the first part to be assembled on collecting hopper 20.

Second part 14 has the rough shape of a ring and is intended to be moving along axis X relative to first part 12.

Ring 14 includes in the area of its downstream end a support face 28 intended to be pressed against the flat face of neck 8 of jar 6. This support face 28 includes means 30 making a tight contact between support face 28 and the neck of the jar. These means 30 are formed, in the represented example, by a lip seal assembled in a groove made in support face 28.

Seal ring 14 includes a shoulder 32 protruding radially outwards upstream from pins 24, cooperating with pins 24 so as to form axial stop means of ring 14 relative to support 12, when seal ring 14 is no longer resting on jar neck 8.

The internal passage 36 of seal ring 14 is fitted, in the area of its downstream end, with a nose 38 of tapered shape so as to divert the powder towards the axis of the pipe, and to protect lip seal 30.

There are sealing means 40 between collecting hopper 10 and first part 12. In the represented example this is a joint assembled in the inner face of pipe 16, which rubs against the outer face of hopper 10.

Joint 40 is such that it tolerates the friction due to the sliding of conveyance pipe 16.

In addition, there are sealing means 42 between first part 12 and second part 14.

Sealing means 42 are such that they provide a mechanical disengagement between supporting ring 12 and seal ring 14 and, more specifically, between collecting hopper 10 and seal ring 14 in contact with the jar.

Indeed, the powders are generally conveyed by means of vibrating systems, of the vibrating chute type, but these vibrations distort the weighing operations. By virtue of the invention these vibrations are not transmitted to the ring, and consequently are not transmitted to jar 4.

In the represented example the sealing means 42 are formed by a flexible bellows extending lengthways between the upstream face of ring 14 and the downstream face of the radial projection of supporting ring 18. Bellows 42 has the advantage that it folds when the second portion II is in the upper position, and therefore that it does not hinder the relative movement of the first and second parts. The bellows shape has the advantage that it has a remanence which does not fluctuate greatly over time, i.e. the effort which it applies to the jar and therefore to the scale is roughly constant over time. This effort may therefore the deduced when measuring. Conversely, a sleeve made from a flexible and compressible material may have a varying remanence, which may cause the support effort on the jar to vary, and therefore the weighing operation to be distorted.

It could be decided to use a flexible element of tubular shape, or one having another section, where this element is chosen such that it does not influence the weighing operation.

In FIG. 3 bellows 42 can be seen with ring 14 and a mounting flange on the first part.

Bellows 42 is assembled by a first upstream end on a mounting flange 46 by means of a clamp connection 48, and the second downstream end on seal ring 14 by means of a clamp connection 50.

The connection of bellows 42 by a downstream end to seal ring 14 is particularly advantageous, since it enables the bellows to be used as a restraint device for the seal ring. Indeed, if it is only the bellows which restrains seal ring 14, the displacement of seal ring 14 is at most equal to the unfolded length of the bellows. The travel of the seal ring is therefore limited, and compatible with operation of the device.

Mounting flange 46 is itself secured on the first part.

A joint is interposed between mounting flange 46 and supporting ring 18.

Mounting flange 46 may advantageously be secured and disengaged easily from the first part, thus enabling easier replacement of the bellows. In the represented example the securing means are of the bayonet type. The first part includes snugs 52 formed from a rod and a head protruding from the downstream face of the first part, and assembly ring 46 includes apertures 54, including a section of lesser width close to that of the diameter of the rod, and a section of greater width close to the diameter of the head to enable them to be inserted into the aperture. For assembly, the snugs need merely be inserted into the sections of greater width, and then the attachment flange 46 pivoted relative to first part 12 on its axis, so as to position the catches in the sections of smaller width.

Bellows 42 is then secured axially to first part 12.

To replace bellows 42, the mounting flange need merely be pivoted in the reverse direction relative to the first part.

The use of clamp connections has the advantage that they are simple and rapid to handle, and they provide safe tightening. However, other fasteners may be used.

The bellows advantageously includes at its lengthways ends lugs 56 radially protruding outwards for assembly of the bellows. These lugs 56 enable bellows 42 to be stretched out in order that it may be put in position in the housings of the interfacing parts. The presence of these lugs 56 facilitates assembly of bellows 42, with the stipulation that it is undertaken remotely with over-gloves and gloves. It may be arranged that the rings are assembled in loops in the lugs, in order to prevent the rings falling in the glove box during assembly.

Conveyance pipe 16 advantageously extends over the entire length of the deployed bellows, protecting the latter from excessive contact with the powder, and preventing the powder from remaining trapped in the pleats of the bellows.

Nuclear fuel powders are very aggressive, notably for synthetic materials such as those used for manufacturing bellows and gasket seals. It is consequently preferable to reduce direct contact between the bellows and the powder. Pipe 16 advantageously reduces this contact.

In addition, if there is a ventilating aperture, a ventilation pipe 44 is formed between conveyance pipe 16 and bellows 42 as far as the ventilating aperture.

Mounting flange 46 advantageously protects the upstream end of bellows 42 against the powder.

In a similar manner, seal ring 14 covers the downstream end of the bellows joint and is interposed between the powder and the joint.

Means are also included to dock ring 14 on the neck of the jar. Jar 4 is advantageously brought close to seal ring 14. Indeed, the scale on which jar 4 is positioned habitually includes means to raise the jar. Thus, the connection device is simplified and uses the pre-existing means.

In FIG. 2A mechanical means 56 can be seen, of the electric jack type, to lower and raise the second portion II. It is also possible to envisage both lowering the second portion II and raising the jar.

We shall now explain the positioning of connection device 2 on neck 8 of the jar if connection device 2 according to the present invention is moved.

Jar 4 is put in position beneath connection device 2.

The second portion II is lowered relative to collecting hopper 10. Supporting ring 18 and conveyance pipe 16 thus slide along hopper 10, with joint 40 rubbing on the inner face of pipe 16, and providing the seal. The seal ring approaches neck 8 of jar 4.

After a certain travel, the support face of seal ring 16 comes into contact with the neck of the jar. Supporting ring 18 continues its travel until pins 24 disengage from shoulder 32 of seal ring 16. Seal ring 16 is then released; it rests on the neck and its weight presses lip seal 30, under the effect of gravity, on to neck 8 of the jar, giving a tight contact, as can be seen in FIGS. 2A and 2B (where the seal is pressed tight). In FIG. 1 lip seal 30 is in its unpressed state.

At that moment connection device 2 is deployed and produces a tight contact between the powder feed area and jar 4. The system is ready for filling jar 4.

It is not necessary for the connection device to be completely deployed, i.e. for first part 12 to be in an extreme lowered position, as represented in FIGS. 2A and 2B. Indeed, the sealing between the device and the jar occurs due to the weight of seal ring 14.

However, a check is made that first part 12 is resting on collecting hopper 10, or more specifically that surfaces 27 and 29 are in contact, in order to guarantee repeatability of the bellows' pressing value, thus guaranteeing an effort due to the remanence of the bellows which is identical in each docking operation. In addition, this metal-on-metal contact provides an additional seal.

During filling the powder flows into collecting hopper 10, and then into conveyance pipe 16 and reaches neck 8 of the jar. The air contained in the jar is evacuated through the vent passage, or passes into the hopper.

The powder flow occurs in a sealed fashion by virtue of lip seal 30, which is pressed on to neck 8 of the jar, by virtue of bellows 42 between supporting ring 18 and seal ring 14, and joint 40 between hopper 10 and supporting ring 18. Confinement of the powder is achieved without using a suction system. Consequently, the problem of the management of the soiled filters is no longer posed. In addition, there is no risk of the seal malfunctioning since it is obtained by static elements.

In addition, the powder feed is generally obtained by means of vibrating chutes (not represented). Due to the mechanical disengagement between collecting hopper 10 and jar 4 obtained by virtue of the bellows, the vibrations produced are not transmitted to the jar, nor therefore to the scale.

The weighing steps are not distorted.

Moreover, the relative positioning of jar 4 and of connection device 2 does not require great accuracy. All that is required is for the pins to disengage relative to the shoulder.

The device according to the present invention therefore provides great operational safety and is easy to maintain.

The jar is removed by lifting first part 12 which, after a certain length of travel, meets pins 24, which raises seal ring 16, and the latter is separated from the neck of the jar. The lifting of first part 12 can occur over a long travel length, enabling the seal ring of the jar to be removed sufficiently far; the jar can then easily be withdrawn from the scale and be removed by a conveyor.

The cooperation of pins 24 and shoulder 32 advantageously enables seal ring 14 to be supported when seal ring 14 is not resting on neck 8 of the jar. However, it could be envisaged to use tight bellows 42 to support seal ring 14. This has the advantage of simplifying connection device 2. However, in this case, bellows 42 is subject to traction stress during all the resting phases, which may reduce its lifetime.

We shall now explain a step of filling of a jar with the goal of manufacturing MOX pellets.

The mixture used to manufacture MOX pellets includes $PuO_2$, $UO_2$ and chamotte.

A filling operation includes the following steps:
 weighing of jar 4 when empty,
 lowering of moving portion II until the seal ring is resting on neck 8 of the jar, and until pins 24 are separated from shoulder 32, weighing of the assembly formed by empty jar 8 and seal ring 14, filling with chamotte; the quantity of chamotte placed in the jar is simultaneously weighed,
 raising of portion II in such a way as to separate seal ring 14 from neck 8 of the jar,
 weighing of jar 4 containing the chamotte; if the mass of chamotte matches the desired value, one then changes to filling with $PuO_2$ and $UO_2$; otherwise the mass of chamotte is adjusted, and seal ring 14 is put back in place,
 after this the seal ring is put back in place on the neck of the jar,
 $PuO_2$ or $UO_2$ is then added; the quantity of oxide placed in the jar is simultaneously weighed,
 portion II is once again raised in such a way as to separate seal ring 14 from neck 8 of the jar,
 the jar containing the chamotte and the oxide is weighed; if the mass of oxide matches the desired value, one then changes to filling with the other oxide; otherwise the mass of the said oxide is adjusted, and seal ring 14 is put back in position,
 seal ring 14 is put back in position on the neck of the jar; the last oxide is placed in the jar; and the quantity of oxide placed in the jar is simultaneously weighed,
 portion II is once again raised in such a way as to separate seal ring 14 from jar 4,
 jar 4 containing the chamotte and the oxides is weighed; if the mass of the other oxide matches the desired value filling is terminated; otherwise the mass of the said oxide is adjusted, putting seal ring 14 back in position.

As mentioned above, the powders are generally conveyed from their tank as far as the connection device by means of vibrating conveyors, known as vibrating chutes.

In order to match the filling rates and also to guarantee the dosing accuracies, the vibrating chutes are operated at high speed, to deliver a mass of powder $M'=M-\Lambda$, where M is the mass of powder desired and $\Lambda$ is a small mass of missing powder.

When the scale detects that mass M' is reached, the conveyor control system reduces the speed, which changes to a medium speed, and then to a low speed, until the scale detects that mass M has been reached. At that moment the vibrating chute is stopped.

This cycle of control of a vibrating chute is similar for each vibrating chute connecting the tanks of chamotte, $PuO_2$ and $UO_2$ to the collecting hopper.

Maintenance of the connection device is simplified. It is therefore easy to replace bellows 42. Indeed, one need merely disengage assembly flange 46 from first part 12 by rotating it, and then separate seal ring 14 and assembly flange 46 from bellows 42 by removing clamp connections 48, 50. Preferentially, before disengaging flange 46 from first part 12, flange 46 and seal ring 14 are secured after having been brought close to one another, for example along a transverse axis. Bellows 42 is compressed and there is no danger of it being damaged by elongation under the load of seal ring 30.

Bellows 42 is then managed as radioactive waste, and seal ring 14 and assembly flange 46 are reassembled on a new bellows 42, which is then put into position in the connection device.

The axial stop means between first part 12 and seal ring 14, in the represented example, are simple to produce and of reliable operation. However, more elaborate stop means may be used, involving for example the moving of parts.

The invention claimed is:

1. A tight connection device for tight connection between a system for feeding with powdery or granular materials and a container fitted with a filling orifice, where the said device includes:
 a stationary connection portion intended to be connected to the feed system, a moving connection portion which moves relative to the stationary connection portion along a vertical direction, said moving connection portion being intended to be connected to the filling orifice of the container, the moving connection portion including:

a first part forming a support which is configured to move relative to the stationary connection portion a second part forming a downstream end of the moving connection portion and supporting at least one seal to accomplish a tight connection by contact with the contour of the filling orifice, said first part and said second part being connected by flexible sealing system such that the downstream end of the moving connection portion and the stationary connection portion can be mechanically disengaged, a device for limiting the movement of the second part away from the first part, said device being active when the second part is not in contact with the contour of the filling orifice, and being inactive when the second part is in contact with the contour of the filling orifice.

2. A tight connection device according to claim 1, in which the limitation device includes radial pins and a shoulder upstream from the pins such that, when the second part comes into contact with the contour of the filling orifice the shoulder and the pins separate.

3. A tight connection device according to claim 1, in which the stationary connection portion forms a hopper collecting the materials, and in which the first part of the moving connection portion includes a supporting ring assembled in sliding and tight fashion around the collecting hopper and in which the second part forms a seal ring, the seal ring and the supporting ring being connected by a tight bellows providing the mechanical disengagement between the stationary connection portion and the downstream end of the moving connection portion.

4. A tight connection device according to claim 3, in which the seal supported by the seal ring is formed by a lip seal assembled in a groove.

5. A connection device according to claim 3, in which the supporting ring is extended by a pipe conveying in the direction of the seal ring.

6. A tight connection device according to claim 5, comprising a seal between the conveyance pipe and the collecting hopper to provide tight sliding.

7. A tight connection device according to claim 3, including a device to cause the supporting ring to slide axially relative to the stationary connection portion.

8. A tight connection according to claim 3, in which the bellows is assembled on the supporting ring by means of a mounting flange, and the upstream and downstream ends of the bellows are attached on the mounting flange and on the seal ring, respectively, by means of clamp connections.

9. A tight connection device according to claim 8, in which the mounting flange is secured axially to the supporting ring by a bayonet system.

10. A tight connection device according to claim 5, including a ventilating aperture in the supporting ring, and communicating with the interior of the jar through a passage demarcated between the bellows and the conveyance pipe.

11. A filling system including a tight connection device according to claim 1, pipes for feeding with powdery or granular materials upstream to the tight connection device, and a weighing device supporting the container, the feed pipes being connected to the stationary connection portion.

12. A filling system according to claim 11, in which the feed pipes are of the vibrating chute type.

13. A filling system according to claim 12, in which the vibrating chutes are operated so as to deliver the materials at high speed at the start of the filling, and then to deliver the materials at slower speeds when the delivered quantity is close to the desired quantity.

14. A filling system according to claim 11, in which the weighing system is able to bring the filling orifice of the container close to the tight connection device.

15. A jar-filling system according to claim 11, with a mixture of powdery materials including uranium oxide and/or plutonium oxide or a mixture of these, and intended for the production of nuclear fuel.

16. A method of filling a container by means of the system for filling a container according to claim 11, including the following steps:

positioning of the container beneath the tight connection device, weighing of the container, bringing the tight connection device close to the container's filling orifice, bringing the seal ring into contact with the contour of the filling orifice in order to make a tight connection, weighing of the assembly formed by the container and the seal ring, arrival of the material or materials.

17. A filling method according to claim 16 in which, between each filling by a material, the seal ring is separated from the contour of the filling orifice and the container with its content is weighed.

* * * * *